United States Patent
Jun et al.

(10) Patent No.: US 9,759,857 B2
(45) Date of Patent: Sep. 12, 2017

(54) BACKLIGHT UNIT

(71) Applicant: LG Display Co., Ltd., Seoul (KR)

(72) Inventors: In Sang Jun, Paju-si (KR); Dong Joong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 181 days.

(21) Appl. No.: 14/570,708

(22) Filed: Dec. 15, 2014

(65) Prior Publication Data
US 2015/0338571 A1 Nov. 26, 2015

(30) Foreign Application Priority Data
May 26, 2014 (KR) ........................ 10-2014-0062815

(51) Int. Cl.
*F21V 8/00* (2006.01)
*G02F 1/1335* (2006.01)
*G02F 1/1333* (2006.01)

(52) U.S. Cl.
CPC ......... *G02B 6/0088* (2013.01); *G02B 6/0083* (2013.01); *G02F 1/133608* (2013.01); *G02F 2001/133317* (2013.01); *G02F 2001/133322* (2013.01)

(58) Field of Classification Search
CPC ............... G02B 6/0088; G02B 6/0083; G02F 1/133608; G02F 2001/133317; G02F 2001/133322
See application file for complete search history.

(56) References Cited

U.S. PATENT DOCUMENTS

| | | | | |
|---|---|---|---|---|
| 6,392,724 | B2 * | 5/2002 | An | ................................... 349/58 |
| 6,525,789 | B1 * | 2/2003 | Lee | ........................ G02B 6/009 349/58 |
| 6,552,761 | B1 * | 4/2003 | Seo | .................. G02F 1/133308 349/58 |
| 8,040,454 | B2 * | 10/2011 | Lee | .................. G02F 1/133308 349/58 |
| 8,773,608 | B2 * | 7/2014 | Zhang | ............... G02F 1/133308 349/58 |
| 2003/0169383 | A1 * | 9/2003 | Kim | ..................... G02B 6/0088 349/58 |
| 2003/0223020 | A1 * | 12/2003 | Lee | ..................... G02B 6/0088 349/58 |
| 2004/0183959 | A1 * | 9/2004 | Ishida | ................. G02F 1/13452 349/58 |
| 2005/0094051 | A1 * | 5/2005 | Lin | ..................... G02B 6/0088 349/58 |
| 2005/0254261 | A1 * | 11/2005 | Lo | ....................... G02B 6/0088 362/633 |
| 2006/0028836 | A1 * | 2/2006 | Shin | ....................... G02B 6/009 362/600 |
| 2006/0147175 | A1 * | 7/2006 | Shinohara | ............ G02B 6/0088 385/146 |
| 2008/0170416 | A1 * | 7/2008 | Yuan | ..................... G02B 6/0088 362/633 |
| 2009/0033827 | A1 * | 2/2009 | Chen | .................... G02B 6/0088 349/58 |

* cited by examiner

*Primary Examiner* — Mary Ellen Bowman
(74) *Attorney, Agent, or Firm* — Dentons US LLP

(57) ABSTRACT

A backlight unit is disclosed which includes: optical members configured to each include a sheet ring portion having an optical sheet hole; a bottom cover configured to receive the optical members; and an optical member fixation portion formed in a fixation portion mounting region of the bottom cover, and configured to include a hook and a holder. The hook is inserted into the optical sheet hole.

20 Claims, 16 Drawing Sheets

BACKLIGHT UNIT

The present application claims priority under 35 U.S.C. §119(a) of Korean Patent Application No. 10-2014-0062815 filed on May 26, 2014, which is hereby incorporated by reference for all purposes in its entirety.

BACKGROUND

Field of the Disclosure

The present application relates to a backlight unit.

Description of the Related Art

A general liquid crystal display device displays a desired image by controlling light transmittances of liquid crystal cells, which are arranged in a matrix shape, according to image information signals. In other words, the liquid crystal display device displays images on a liquid crystal panel using light irradiated from a backlight unit.

The liquid crystal display device using the above-mentioned principle has features of thinner, lighter weight, lower power consumption and lower driving voltage. As such, the liquid crystal display device has been widely applied to a variety of fields.

For example, the liquid crystal display device is being used in office automation appliances, audio/video appliances and so on.

Such a liquid crystal display device controls light transmittances of liquid crystal cells using signals which are applied to a plurality of control switches arranged in a matrix shape. As such, a desired image is displayed on a screen.

The liquid crystal display device has been widely applied to monitors of the computers, television receivers, display devices of navigation systems for vehicles, mobile phones, portable display devices and so on.

Such a liquid crystal display device is a non-emissive type device which displays images by adjusting the quantity of light applied from an external light source. As such, the liquid crystal display device is necessary for a backlight unit which includes a separated light source and applies light to the liquid crystal panel.

The backlight unit includes: light emitting diodes (LEDs) used as a light source: a light guide plate disposed opposite to a light emission surface of the LEDs; and a plurality of optical sheets disposed on the light guide plate. Also, the backlight unit includes a guide panel configured to support the liquid crystal panel and prevent light leakage.

As the liquid crystal display device is being fabricated in large-sizes, mold fabrication and transport cost of the guide panel must be increased.

SUMMARY OF THE INVENTION

Accordingly, the present application is directed to a backlight unit that substantially obviates one or more problems due to the limitations and disadvantages of the related art.

An advantage of the present invention is to provide a backlight unit which includes fixation portions suitable to substitute a guide panel.

Another advantage of the present invention is to provide a backlight unit which includes a bottom cover suitable to guide and fasten optical sheets and a liquid crystal panel.

Another advantage of the present invention is to provide a backlight unit which realizes a narrow bezel.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

To achieve these and other advantages and in accordance with the purpose of the present invention, as embodied and broadly described, a backlight unit includes: optical members configured to each include a sheet ring portion in which an optical sheet hole; a bottom cover configured to receive the optical members; and a optical member fixation portion formed in a fixation portion mounting region of the bottom cover, and configured to include a hook and a holder, wherein the hook is inserted into the optical sheet hole.

The backlight unit according to one general aspect of the embodiments further includes a panel support/guide member combined with the hook and the holder and configured to guide the panel.

In the backlight unit according to one general aspect of the embodiments, the panel support/guide member includes: a panel support plate configured to support a panel; a hook ring portion pierced by the hook; a hook rack configured to lock the hook; and an insertion fastener inserted into the holder.

The backlight unit according to one general aspect of the embodiments further includes a pad disposed on the panel support plate.

The backlight unit according to one general aspect of the embodiments further includes an optical member support portion configured to support the optical members and guide a panel. The optical member support portion includes: a first body plate formed to guide an edge of the panel; and first support walls extended from both side edge of a lower portion of the first body plate in inward directions of the bottom cover and configured to support the optical members.

The backlight unit according to one general aspect of the embodiments further includes a first multipurpose fixation portion configured to guide a panel and fasten a printed circuit board. The first multipurpose fixation portion includes: a vertical plate configured to guide the panel; a first horizontal bump formed to extend from the vertical plate in an outward direction of the bottom cover; and a first protrusion formed to protrude from the first horizontal bump in a frontward direction of the bottom cover and configured to fasten the printed circuit board.

The backlight unit according to one general aspect of the embodiments further includes a second multipurpose fixation portion configured to guide a panel and fasten a printed circuit board. The second multipurpose fixation portion includes: a second body plate formed to guide the panel; a second horizontal bump formed to extend from the second body plate in an outward direction of the bottom cover; a second protrusion formed to protrude from the second horizontal bump in a frontward direction of the bottom cover and configured to fasten the printed circuit board; and second support walls extended from both side edge of a lower portion of the second body plate in inward directions of the bottom cover and configured to support the optical members.

The backlight unit according to one general aspect of the embodiments further includes a panel-support/sheet-fixation pad configured to support a panel and fasten the optical members.

In the backlight unit according to one general aspect of the embodiments, the panel-support/sheet-fixation pad includes: a body frame disposed on the optical members; a hook ring portion formed to extend from an outer side surface of the body frame; and a hook hole formed in the hook ring portion and pierced by the hook.

The backlight unit according to one general aspect of the embodiments allows not only a lower surface of the body frame to fasten the optical members but also an upper surface of the body frame to support the panel.

In another aspect of the present invention, a bottom cover includes: a top-opened case formed to include a front wing surface and configured to receive optical members; and an optical member fixation portion formed in the front wing surface of the case. The optical member fixation portion includes a hook formed to extend from the front wing surface of the case in a frontward direction and configured to fasten the optical members.

The bottom cover according to another general aspect of the embodiments further includes an optical member support portion configured to support the optical members and guide a panel. The optical member support portion includes: a first body plate formed to guide an edge of the panel; and first support walls extended from both side edge of a lower portion of the first body plate in inward directions of the case and configured to support the optical members.

The bottom cover according to another general aspect of the embodiments further includes a first multipurpose fixation portion configured to guide a panel and fasten a printed circuit board. The first multipurpose fixation portion includes: a vertical plate configured to guide the panel; a first horizontal bump formed to extend from the vertical plate in an outward direction of the case; and a first protrusion formed to protrude from the first horizontal bump in a frontward direction of the case and configured to fasten the printed circuit board.

The bottom cover according to one general aspect of the embodiments further includes a second multipurpose fixation portion configured to guide a panel and fasten a printed circuit board. The second multipurpose fixation portion includes: a second body plate formed to guide the panel; a second horizontal bump formed to extend from the second body plate in an outward direction of the case; a second protrusion formed to protrude from the second horizontal bump in a frontward direction of the case and configured to fasten the printed circuit board; and second support walls extended from both side edge of a lower portion of the second body plate in inward directions of the case and configured to support the optical members.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE ILLUSTRATED EMBODIMENTS

Figure 1:
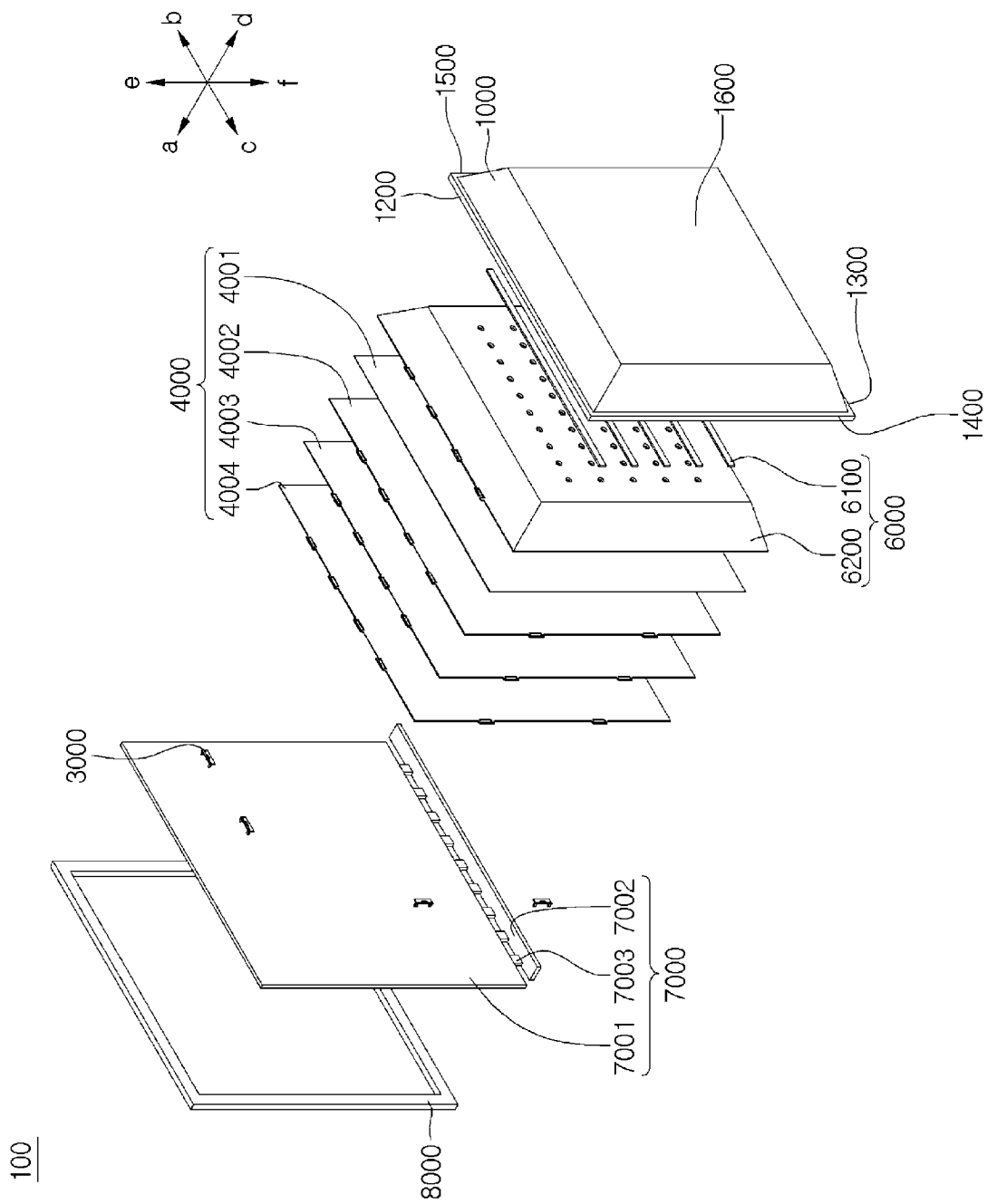
FIG. 1 is an exploded perspective view showing a backlight unit according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

FIG. 1 is an exploded perspective view showing a backlight unit according to a first embodiment of the present disclosure.

In the drawing, 'a' direction is defined as a frontward direction of the backlight unit 100, 'b' direction is defined as a rightward direction of the backlight unit 100, 'c' direction is defined as a leftward direction of the backlight unit 100, direction is defined as a rearward direction of the backlight unit 100, 'e' direction is defined as a upward direction of the backlight unit 100, and 'f' direction is defined as a downward direction of the backlight unit 100. In detail, 'b' direction corresponds to a right side surface direction among four side surface directions of the backlight unit 100, 'c' direction corresponds to a left side surface direction among the four side surface directions of the backlight unit 100, 'e' direction corresponds to an upper side surface direction among the four side surface directions of the backlight unit 100, and 'f' direction corresponds to a lower side surface direction among the four side surface directions of the backlight unit 100.

Referring to FIG. 1, the backlight unit 100 according to a first embodiment of the present disclosure can include a bottom cover 1000, a light source portion 6000, optical members 4000 and panel support/guide members 3000. A panel 7000 and a top case 8000 can be sequentially disposed on the front surface (or upper surface) of the backlight unit 100.

The bottom cover 1000 and the panel support/guide member 3000 can be formed from a plastic material. The top case 8000 can be formed from either a plastic material such as polycarbonate PC or a metal material.

The panel 7000 can include a liquid crystal panel 7001, a PCB (printed circuit board) 7002 and FPCs (flexible printed circuits) 7003. The PCB 7002 is used to drive the liquid crystal panel 7001. The FPCs 7003 provide electrical paths configured to transfer signals from the PCB 7002 to the liquid crystal panel 7001.

The liquid crystal panel 7001 includes a color filter array substrate, a thin film transistor array substrate and a liquid crystal layer interposed between the two substrates.

Although it is not shown in the drawing, the liquid crystal panel 7001 can further include a front polarization plate attached on the front surface (or upper surface) of the color filter array substrate, and a rear polarization plate attached on the rear surface (or lower surface) of the thin film transistor array substrate. The front and rear polarization plates polarize light transmitting the liquid crystal panel 7001 in directions perpendicular to (crossing) each other.

Such a liquid crystal panel 7001 includes liquid crystal cells which are defined in pixel units and arranged in a matrix shape. As such, the liquid crystal panel 7001 displays images by adjusting light transmittances of the liquid crystal cells in response to image information signals applied from the PCB 7002.

The thin film transistor array substrate includes a plurality of gate lines and a plurality of data line which are formed in a matrix shape. Also, the thin film transistor array substrate includes thin film transistors TFTs formed at intersections of the gate lines and the data lines.

The thin film transistor can be used to apply a signal voltage received from the PCB 7002 between a respective pixel electrode and a common electrode of the color filter array substrate which will be described later. In accordance therewith, liquid crystal molecules between the pixel electrode and the common electrode are re-aligned by the signal voltage. As a result, light transmittance of the liquid crystal cell is re-adjusted.

The light source portion 6000 can include light sources 6100 and a light source receptacle 6200. The light sources 6100 are arranged in the light source receptacle 6200.

In detail, the light sources 6100 can be inserted into light source holes which are formed in the bottom surface 6230.

The light source receptacle 6200 can be formed in a shape opposite to the bottom cover 1000. As such, the light source receptacle 6200 can be received into the bottom cover 1000. Also, the light source receptacle 6200 can be used as a reflective sheet. In detail, the light source receptacle 6200 reflects light downwardly progressing from a light guide plate 4001 toward the light guide plate 4001 so that the light efficiency of the backlight unit 100 becomes higher. Also, the light source receptacle 6200 reflects lights emitted from the light sources 6100 and brightness to be uniformed throughout a light output surface. In order to provide the reflective function to the light source receptacle 6200, a reflective material is coated on inner surfaces of the light source receptacle 6200.

As examples of the light source 6100, a cold cathode fluorescent lamp CCFL, an external electrode fluorescent lamp EEFL and light emitting diodes LEDs can be used. However, it will now be described that the LEDs are applied to the light source 6100 as an example. In this case, the light source 6100 can include a plurality of LEDs and a substrate loaded with the LEDs.

The optical members 4000 can include the light guide plate 4001 and a plurality of optical sheets 4002, 4003 and 4004.

The plurality of optical sheets 4002, 4003 and 4004 can include a diffusive sheet 4002, a prism sheet 4003 and a protective sheet 4004. As needed, the plurality of optical sheet 4002, 4003 and 4004 can include two diffusive sheets and two prism sheets. The diffusive sheet 4002 can include a base sheet and a coating layer which is embossed to have hemispheres and formed on the base sheet.

The diffusive sheet 4002 can be used to diffuse light which is applied from the light source portion 6000 to the liquid crystal panel 7001. As needed, two or three diffusive sheets 4002 can be used one upon another.

The prism sheet 4003 can be formed to have micro prisms arranged on its upper surface in a fixed interval. The micro prisms can be each formed in a triangular pyramid (or horn). The prism sheet 4003 can be used to concentrate diffused light from the diffusive sheet 4002 in a perpendicular direction to the surface of the liquid crystal panel 7001. In general, the prism sheet 4003 is uses by twos. The micro prism formed on the prism sheet 4003 has a fixed apex angle. As such, most light transmitting the prism sheet 4003 progresses perpendicularly to the prism sheet 4003. In accordance therewith, brightness can be evenly (or uniformly) distributed in the prism sheet 4003.

The protective sheet 4004 is disposed on the top of the optical sheets 4002 through 4004. Such a protective sheet 4004 can protect the prism sheet 4003 easy to damage due to scratches.

The light guide plate 4001 is disposed over the LEDs and in the rear side of the liquid crystal panel 7001. Also, the light guide plate 4001 can guide lights emitted from the LEDs toward the rear surface of the liquid crystal panel 7001.

The light guide plate 4001 can be formed from polymethyl-methacrylate PMMA with high strength and superior transmittance. As such, the light guide plate 4001 cannot be easily deformed or broken. Also, the light guide plate can be formed in a wedge shape which includes an inclined lower surface and a flattened upper surface. Alternatively, the light guide plate 4001 can be formed in a flat shape which includes flattened upper and lower surfaces.

The light guide plate 4001 with the wedged shape can be applied to a liquid crystal display device which is used in notebook computers, mobile phones and so on. In this case, the light source 6000 can be disposed on the side wall of the thickest edge of the light guide plate 4001.

Figure 2:
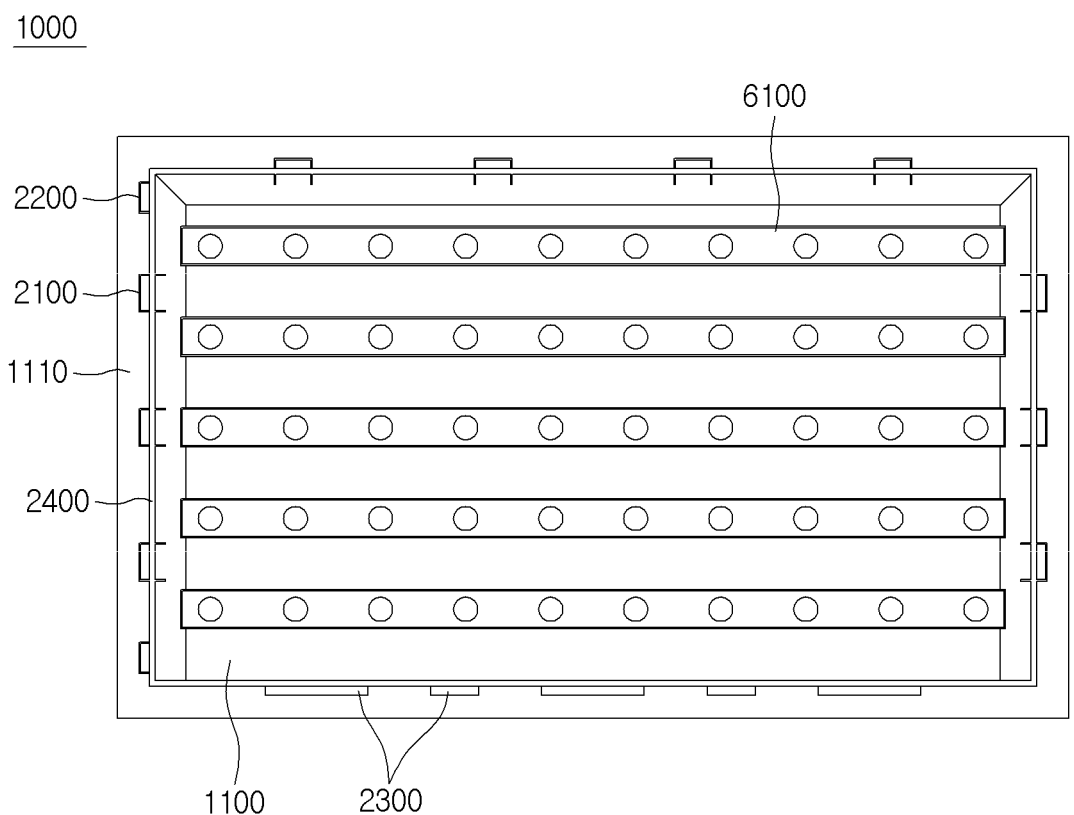
FIG. 2 is a planar view showing a bottom cover according to an embodiment of the present disclosure.
Figure 3:
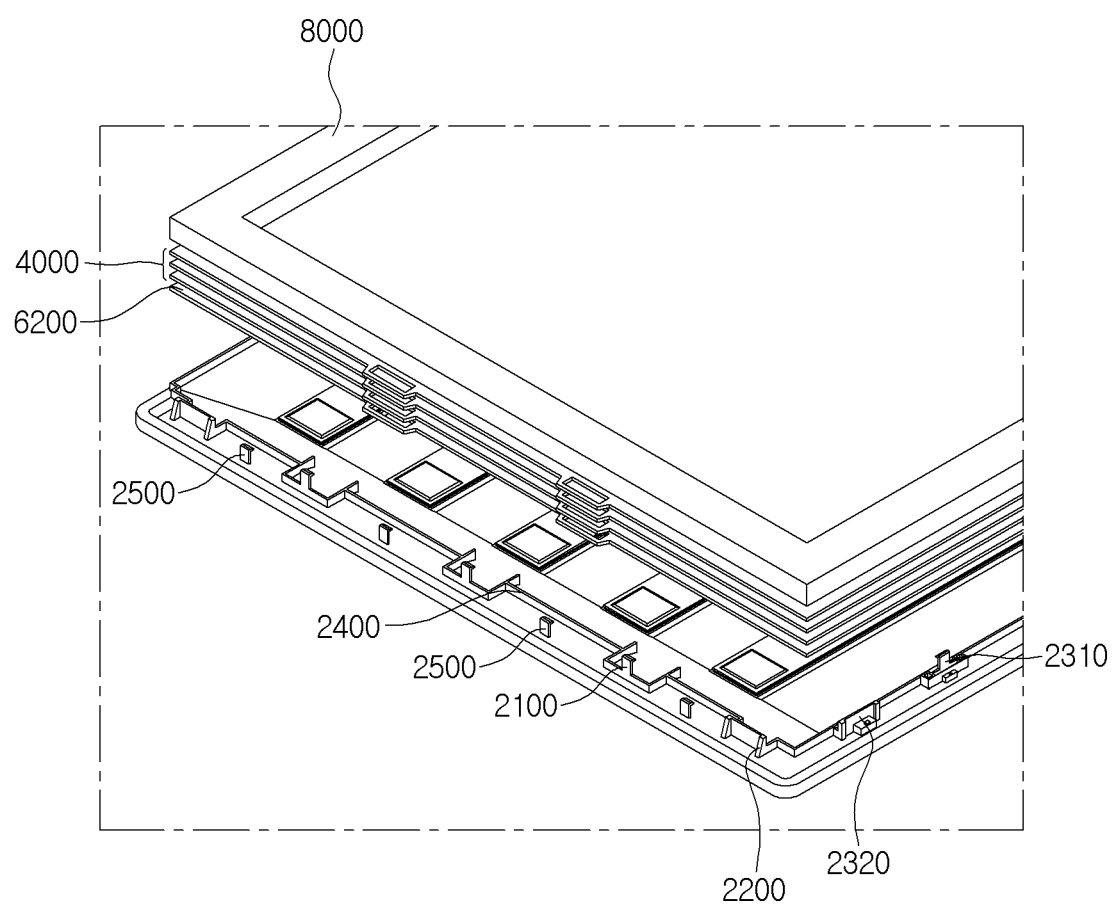
FIG. 3 is a perspective view showing one side portion of the backlight unit.

FIG. 2 is a planar view showing a bottom cover according to an embodiment of the present disclosure. FIG. 3 is a perspective view showing a side portion of the backlight unit of FIG. 1.

Referring to FIGS. 1 through 3, the bottom cover 1000 according to an embodiment of the present disclosure includes a front wing surface 1100, an upper side surface 1200, a lower side surface 1300, a left side surface 1400, a right side surface and a rear surface 1600.

The bottom cover 1000 can be formed in a top-opened rectangular case shape. Also, the bottom cover 1000 can include the front wing surface formed to expand from top edges of the top-opened box in the outward direction.

The front wing surface 1100 of the bottom cover 1000 can be defined as a mounting area of fixation portions. A reference prominence 2400 can be formed along the front wing surface 1100 of the bottom cover 1000.

The reference prominence 2400 can be formed in such a manner as to protrude from the front wing surface 1100 of the bottom cover 1000 in the frontward direction.

Fixation portions can be formed in fixed regions of the reference prominence 2400 as shown in FIG. 3. The fixation portions can include an optical member fixation portion 2100, an optical member support portion 2200, multipurpose fixation portions 2300 and an optical member guide portion 2500.

The optical sheet guide portions 2500 can be formed to protrude from edge regions 1110 of the front wing surface edge 1110 of the bottom cover 1000 in the frontward direction. Such optical member guide portions 2500 can guide the slight movements of the panel 7000 and the optical members 4000 in the upward, downward, leftward and rightward directions and allow the panel 7000 to be fastened within the fixed area.

Figure 4:
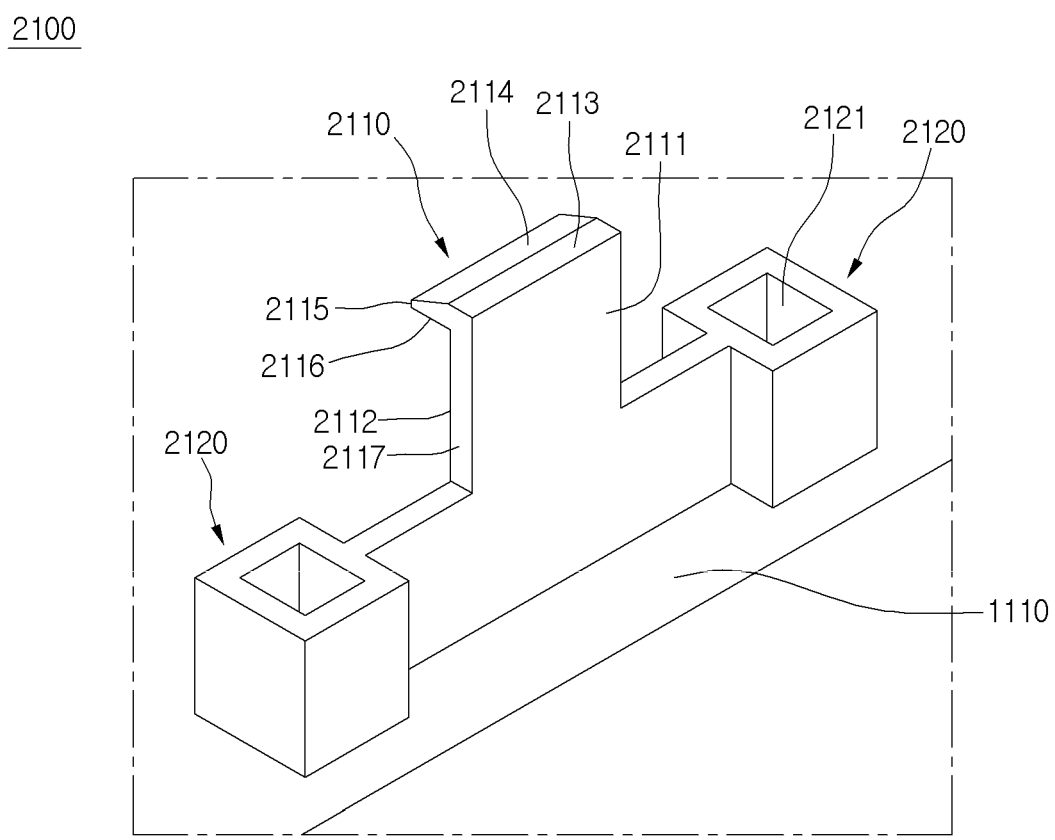
FIG. 4 is a perspective view showing an optical sheet fixation portion of fixation portions according to an embodiment of the present disclosure.

FIG. 4 is a perspective view showing an optical member fixation portion according to an embodiment of the present disclosure.

The optical member fixation portion 2100 will now be described in detail with reference to FIGS. 1 through 4.

The optical member fixation portion 2100 can guide and fasten the optical members 4000. To this end, the optical member fixation member 2100 can include a hook 2110 and holders 2120.

The optical member fixation portion 2100 includes a single hook 2110 and two holders 2120. Such an optical member fixation portion 2100 can be formed in several regions. The plurality of optical member fixation portions 2100 can be arranged along an outer edge region 1110 of the front wing surface 1100 of the bottom cover 1000 in such a manner as to be separate from one another.

The holder 2120 is combined with the panel support/guide member 3000. Such a holder 2120 can be a rectangular cylinder with a hole 2121.

In detail, the holder 2120 can be formed in such a manner as to protrude from an edge region 1110 of the front wing surface 1100 of the bottom cover 1000 in the frontward direction. The holder 2120 with the rectangular cylinder shape has a top-opened hole 2121. Although it is shown in the drawings that the holder 2120 has the rectangular cylinder shape and the rectangular hole 2121, it is not limited to this. Alternatively, the holder 2120 can be formed in a variety of cylinder shapes, such as circular and triangular cylinders and so on. Similarly, the hole 2121 of the holder 2120 can be formed in a variety of shapes, such as circular and triangular shapes and so on.

The two holders 2120 included in the optical member fixation portion 2100 can be separated from each other. Also, the two holders 2120 can be disposed with having the hook 2110 therebetween. Moreover, the two holders 2120 and the hook 2110 can be formed in a single body united with one another.

The hook 2110 can lock (or fasten) the optical sheets 4002, 4003 and 4004 of the optical members 4000.

The hook 2110 can be formed to extend from an edge region 1110 of the front wing surface edge 1100 of the bottom cover 1000 in the frontward direction. Such a hook 2110 can include a first surface 2111 toward an outward direction, second and fifth surfaces 2112 and 2115 toward inward directions, third and fourth surfaces 2113 and 2114 toward frontward directions, a sixth surface 2116 toward a rearward direction, and left and right side surfaces 2117.

The first surface 2111 and the second surface 2112 of the hook 2110 are parallel to each other. The third surface 2113 of the hook 2110 extends inwardly from the first surface 2111 in a perpendicular direction thereto. The fourth surface 2114 of the hook 2110 is an inclined surface which extends from the first surface 2111 in a rearward direction at a slant.

The fifth surface 2115 of the hook 2110 extends from the fourth surface 2114 in a rearward direction in such a manner as to be parallel to the first surface 2111. The sixth surface 2116 of the hook 2110 extends from the fifth surface 2115 in an outward direction in such a manner as to be parallel to the third surface 2113.

Such a hook 2110 can be formed to have a larger height in the frontward direction 'a' compared to the holder 2120. Also, the hook 2110 can be formed in such a manner as to be separate from the two holders 2120 by a fixed distance.

Figure 5:
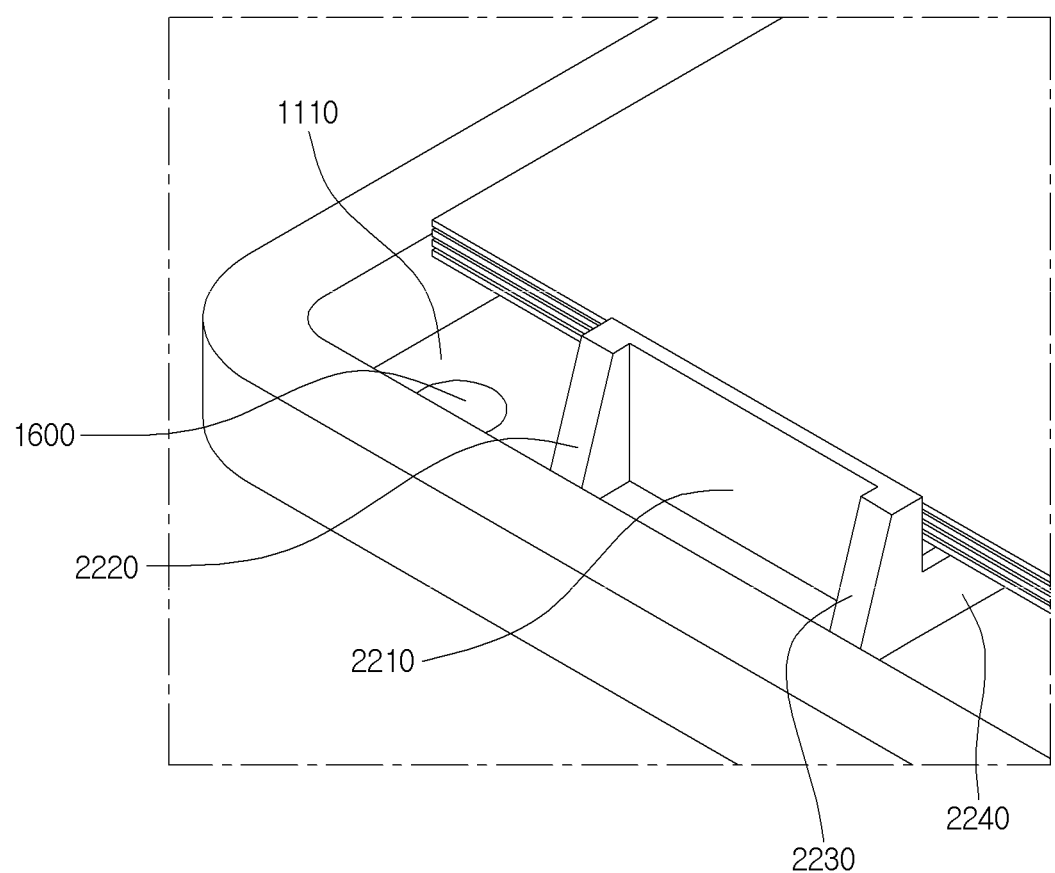
FIG. 5 is a perspective view showing an optical sheet support portion of fixation portions according to an embodiment of the present disclosure.

FIG. 5 is a perspective view showing an optical member support portion according to an embodiment of the present disclosure.

The optical member support portion 2200 according to an embodiment of the present disclosure will be described in detail with reference to FIGS. 1 through 3 and 5.

The optical member support portion 2200 can include a first body plate 2210, a left side reinforce wall 2220 of the first body plate 2210, a right side reinforce wall 2230 of the first body plate 2210 and support walls 2240 of the first body plate 2210.

The first body plate 2210 can be formed to extend from an edge region 1110 of the front wing surface 1100 in the frontward direction 'a'.

The first body plate 2210 can be formed in a rectangular plate shape. One of two surfaces of the first body plate 2210 is opposite to the outward direction of the bottom cover 1000, and the other surface of the first body plate 2210 is opposite to the inward direction of the bottom cover 1000.

Also, an upper side surface of the first body plate 2210 is opposite to the frontward direction and a lower side surface of the first body 2210 opposite to the rearward direction comes in contact with an edge region 1110 of the front wing surface 1100.

The left side reinforce wall 2220 of the first body plate 2210 can be formed in a bending shape which is bent from the left edge of the first body plate 2210 in the outward direction of the bottom cover 1000. The right side reinforce wall 2230 can also be formed in a bending shape which is bent from the right edge of the first body plate 2210 in the outward direction of the bottom cover 1000 'b'.

Outer side surfaces of the left and right side reinforce walls 2220 and 2230 can be slantly formed. In other words, the outer side surfaces of the left and right side reinforce walls 2220 and 2230 can be formed to have an acute angle with respect to the front wing surface 1100 of the bottom cover 1000.

The first body plate 2210 and the left and right side reinforce walls 2220 and 2230 can be formed in a single body united with one another. Also, the first body plate 2210 and the left and right side reinforce walls 2220 and 2230 can make a planar shape of '⊂'.

The support walls 2240 can be formed to extend from the lower portion edges of the inner surface the first body plate 2210 in the inward direction of the bottom cover 1000.

The support walls 2240 and the first body plate 2210 can be formed in a single body united with each other. Also, the first body plate 2210 and the support walls 2240 can form a side shape of 'L'. As such, the first body plate 2210, the left and right side reinforce walls 2220 and 2230 and the support walls 2240 can be formed in a single body united with one another.

The first body plate 2210 can be used to guide slight movements of the panel 7000 within a fixed area. In other words, the panel 7000 can slightly move in the four side surface directions (i.e., the rightward, leftward, upward and downward directions) 'b', 'c', 'e' and 'f'. Also, the support walls 2240 can be used to support the optical members 4000. Actually, the rear surface edge of the light guide plate 4001 corresponding to the lowest layer of the optical members 4000 can be placed on the upper side surfaces of the support walls 2240. In other words, the optical members 4000 can be placed on the support walls 2240 along the rearward direction 'd'.

A combinatorial hole 1600 is formed in the front wing surface edge region 1110 of the bottom cover 1000. The combinatorial hole 1600 can be used to combine the bottom cover 1000 with the top case 8000 or different components, in order to complete the combination of the liquid crystal display device. To this end, a screw penetrating through the combinatorial hole 1600 can be used.

Figure 6:
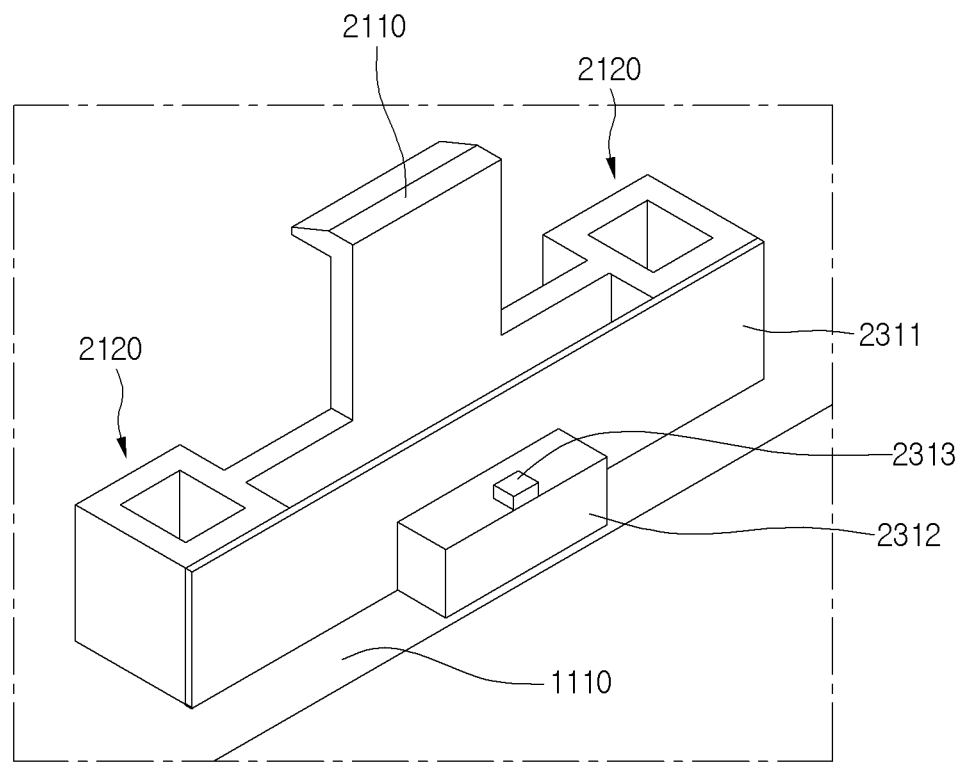
FIG. 6 is a perspective view showing a first multipurpose fixation portion of fixation portions according to an embodiment of the present disclosure.
Figure 7:
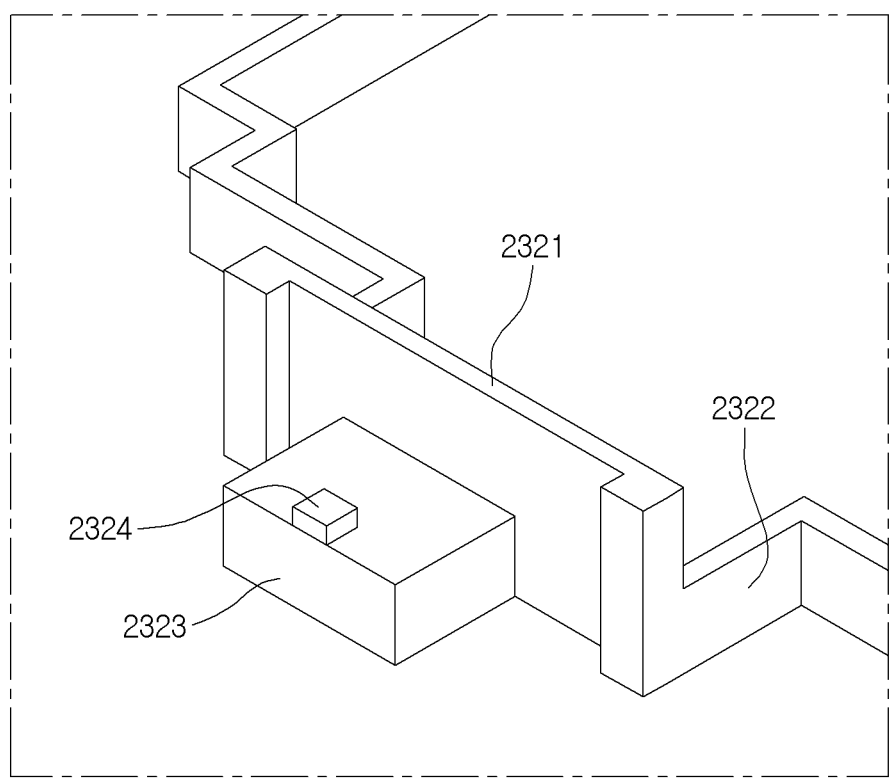
FIG. 7 is a perspective view showing a second multipurpose fixation portion of fixation portions according to an embodiment of the present disclosure.

FIG. 6 is a perspective view showing a first multipurpose fixation portion according to an embodiment of the present disclosure. FIG. 7 is a perspective view showing a second multipurpose fixation portion according to an embodiment of the present disclosure.

The multipurpose fixation portions 2300 will now be described in detail with reference to FIGS. 1 through 3, 6 and 7.

The multipurpose fixation portions include the first multipurpose fixation portion 2310 and the second multipurpose fixation portion 2320. The first multipurpose fixation portion 2310 can be used to simultaneously fasten the optical members 4000 and the PCB 7002. The second multipurpose fixation portion 2320 can be used to guide the panel 7000 and simultaneously fasten the PCB 7002.

Referring to FIGS. 1 through 3 and 6, the multipurpose fixation portion 2310 can include a single hook 2110 and two holders 2120, like the optical member fixation portion 2100. Also, the first multipurpose fixation portion 2310 can include a vertical plate 2311 coming in contact with the outer surface of the two holders 2120 opposite to the outward direction of the bottom cover 1000 and a first horizontal bump 2312 protruding from the vertical plate 2311 in the outward direction of the bottom cover 1000.

The outer surface of the first vertical plate 2311 can be opposite to one surface of the PCB 7002. The first horizontal bump 2312 can be opposite to a lower side surface of the PCB 7002.

The vertical plate 2311 and the first horizontal bump 2312 can be used to fasten the PCB 7002. Also, the first vertical plate 2311 and the first horizontal bump 2312 can be formed in a single body united with each other.

Moreover, the first multipurpose fixation portion 2310 can include at least one first protrusion 2313 formed to protrude from the first horizontal bump 2312 in the frontward direction of the bottom cover 1000. The first protrusion 2313 can be separated from the vertical plate 2311 by a fixed distance. The first protrusion 2313 can be used to prevent a separation (or detachment) of the PCB 7002 when the PCB 7002 is attached on the vertical plate 2311.

Although it is shown in the drawings that the vertical plate 2311 has the same height as the holders 2120, it is not limited to this. In other words, the vertical plate 2311 can be formed to have a larger height compared to the holders 2120 on the basis of the size of the PCB 7002.

The distance (or gap) between the outer surface of the vertical plate 2312 and the first protrusion 2313 can be corresponds to thickness of the PCB 7002. As such, the PCB 7002 can be fastened by being wedged in between the vertical plate 2311 and the first protrusion 2313.

Referring to FIGS. 1 through 3 and 7, the second multipurpose fixation portion 2320 can include a second body plate 2321, two side walls 2322, and a second horizontal bump 2323 and second protrusion 2324. The two side walls 2322 can be formed to extend from both side edges of the second body plate 2321 in the inward direction of the bottom cover 1000. Also, the two side walls 2322 can have a smaller height compared to the second body plate 2321. The second horizontal bump 2323 can be formed to protrude from the outer surface of the second body plate 2321 in the outward direction of the bottom cover 1000. The second protrusion 2324 can be formed to protrude from the upper surface of the second horizontal bump 2323 in the frontward direction of the bottom cover 1000.

The inner surface of the second vertical plate 2321 can be used to guide the panel 7000.

The upper surfaces of the two side walls 2322 can be opposite to a lower surface edge of an optical member (i.e., the light guide plate 4001) corresponding to the lowest layer of the optical members 4000. As such, the optical members 4000 can be placed on the two side walls 2322.

The second protrusion 2324 is separated from the outer surface of the second body plate 2321. The outer surface of the second body plate 2321 can be opposite to one surface of the PCB 7002. The upper surface of the second horizontal bump 2323 can be opposite to the lower edge of the PCB 7002. The second protrusion 2324 can be used to prevent the separation (or detachment) of the PCB 7002 which the PCB 7002 is attached on the outer surface of the second body plate 2321. Moreover, in order to securely fasten the PCB 7002, both edges of the second body plate 2321 can be bent in the outward direction of the bottom cover 1000. In this case, the PCB 7002 can be securely fastened by being wedged in between the second protrusion 2324 and both the bent edges of the second body plate 2321.

Figure 8:
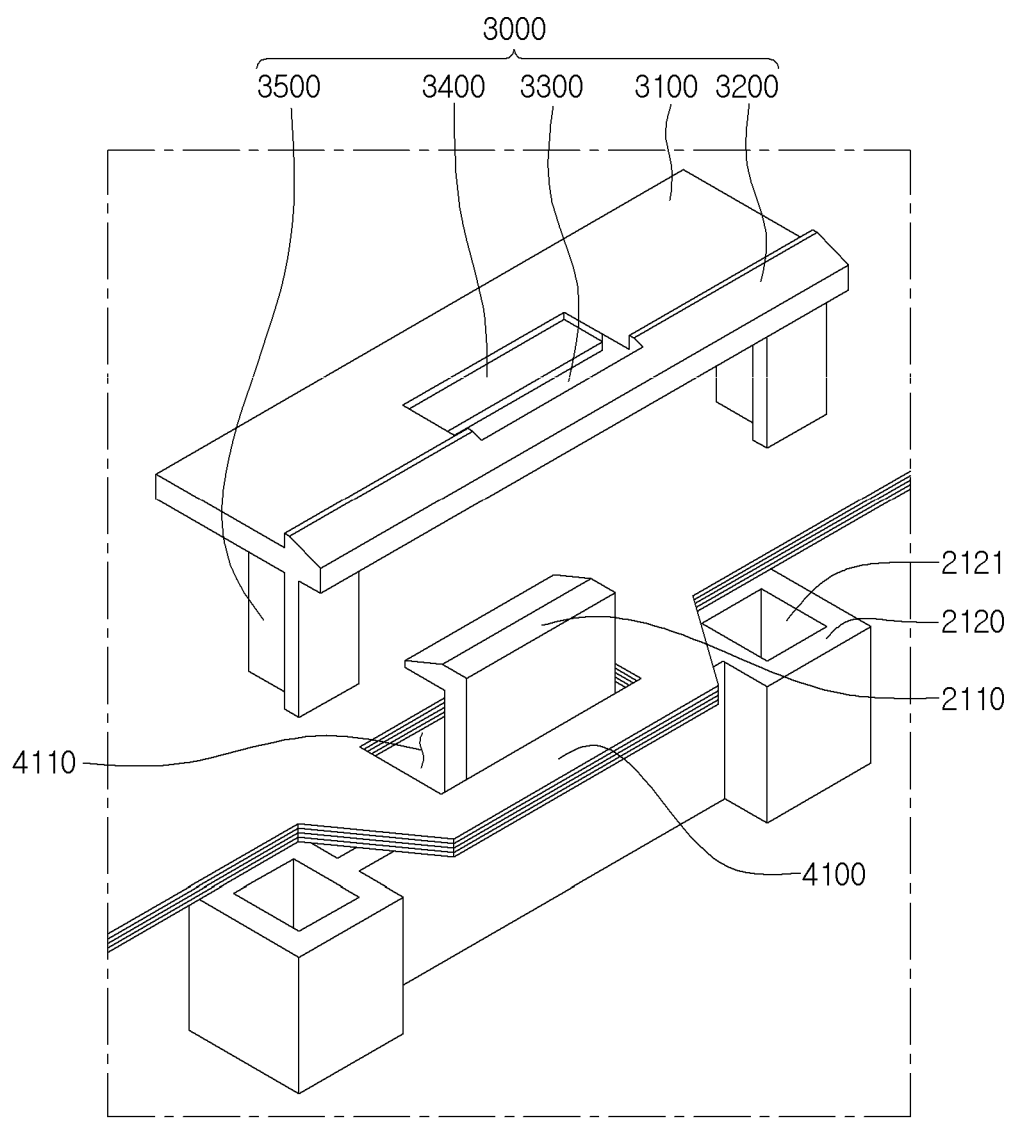
FIG. 8 is a perspective view showing a bottom cover, optical sheets and a panel support/guide member according to an embodiment of the present disclosure.
Figure 9:
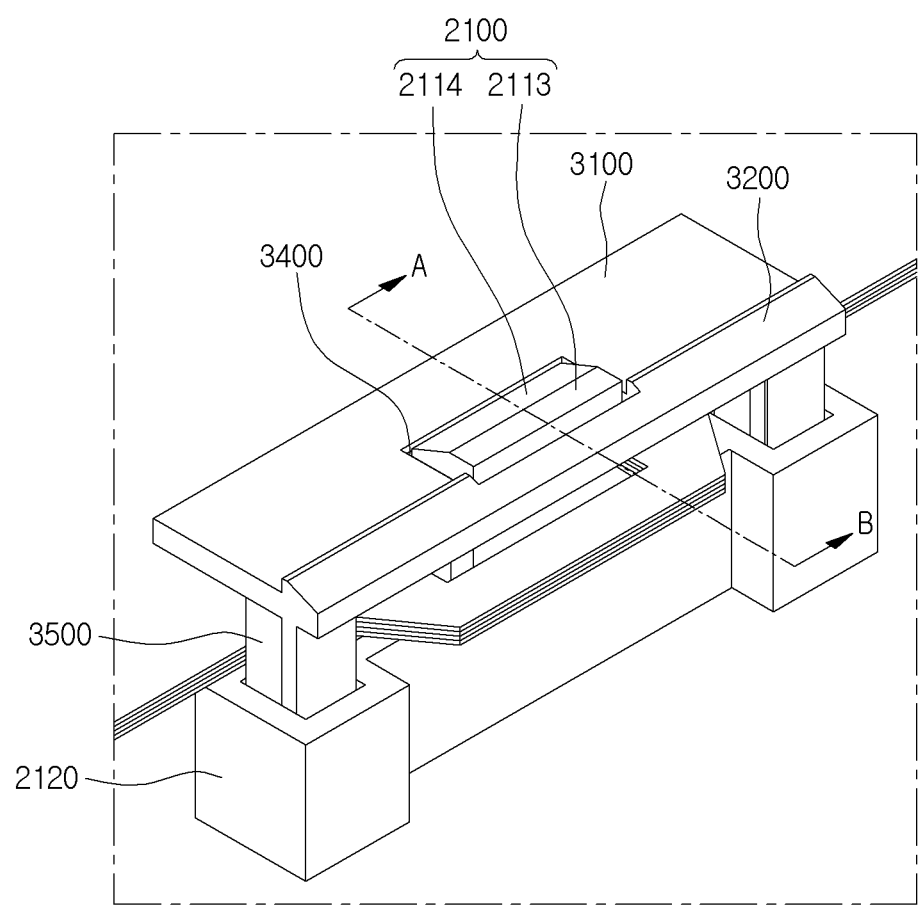
FIG. 9 is a perspective view showing a combinatorial state of a bottom cover, optical sheets and a panel support/guide member.

FIG. 8 is a perspective view showing a bottom cover, optical sheets and a panel support/guide member according to an embodiment of the present disclosure. FIG. 9 is a perspective view showing a combination of a bottom cover, optical sheets and a panel support/guide member.

The panel support/guide member and sheet ring portions of the optical sheets according to an embodiment of the present disclosure will now be described in detail with reference to FIGS. 1 through 4, 8 and 9.

As shown in FIGS. 1 through 4, 8 and 9, the optical members 4000 includes the plurality of optical sheets 4002, 4003 and 4004.

At least one sheet ring portion 4100 is formed in the edge of each optical sheet 4002, 4003 or 4004. An optical sheet hole 4110 is formed in the sheet ring portion 4100. The above-mentioned hook 2110 can penetrate through the optical sheet hole 4110. As such, the sheet ring portion 4100 can be formed in the edge of each optical sheet 4002, 4003 or 4004 by the same number as the hooks 2110.

All the sheet ring portions 4100 of the optical sheets 4002, 4003 and 4004 can be formed in the same position and locked by a single hook 2110. In other words, the sheet ring portions 4100 of each optical sheet 4002, 4003 or 4004 can be opposite to one by one the hooks 2110. Alternatively, the sheet ring portions 4100 of some optical sheets can be formed alternately with those of the other optical sheets in position. In this case, the sheet ring portions of some optical sheets can be locked with some hooks 2110 and the sheet ring portions of the other optical sheets can be locked with the other hooks 2110.

The light source receptacle 6200 is disposed under the optical sheets 4002, 4003 and 4004. Like the optical sheets 4002, 4003 and 4004, locking ring portions are formed in edges of the light source receptacle 6200. As such, the light source receptacle 6200 together with the optical sheets 4002, 4003 and 4004 can be locked (or fastened to) with the hooks 2110.

The panel support/guide member 3000 can include a panel support plate 3100, a panel guide rib 3200, a hook hole 3300, a hook rack 3400 and insertion fasteners 3500.

The panel support plate 3100 can be used to support the liquid crystal panel 7001. The upper surface of the panel support plate 3100 can be opposite to a rear surface edge of the liquid crystal panel 7001. The lower surface of the panel support plate 3100 can be opposite to an upper surface edge of the highest layer optical-sheet 4003 of the optical members 4000.

The panel guide rib 3200 can guide the slight movements of the panel 7000 in left and right directions. In other words, the panel guide rib 3200 can fasten the panel 7000 in such a manner that the panel 7000 is slightly movable within a fixed region. The panel guide rib 3200 can be formed to protrude from the outer edge of the panel support plate 3100 in the frontward direction of the bottom cover 1000. The inner side surface of the panel guide rib 3200 can be opposite to a side surface of the liquid crystal panel 7001.

The hook hole 3300 is formed in a region of the panel support plate 3100 adjacent to the panel guide rib 3200. The hook hole 3300 can be pierced by the hook 2110.

The hook rack 3400 can be formed within the hook hole 3300. Also, the hook rack 3400 can be formed by expanding the panel support plate 310 in the inward direction of the hook hole 3300. The upper surface of the hook rack 3400 can be parallel to the upper surface of the panel support plate 3100.

The panel support plate 3100 and the hook rack 3400 can be formed in a single body with a single stair shape.

The upper surface of the hook rack 3400 can come in contact with the sixth surface 2116 of the hook 2110 when the hook 2110 is inserted into the hook hole 330.

The panel support/guide member 3000 can include a pair of insertion fasteners 3500. The insertion fastener 3500 is inserted into the hole 2121 of the holder 2120. As such, the insertion fastener 3500 can be formed in an opposite pillar shape to the hole 2121 of the holder 2120. Also, the insertion fasteners 3500 can be formed to protrude from both ends of the rear surface of the panel support plate 3100 in the downward direction (i.e., the rearward direction of the bottom cover 1000).

The position relation of the panel support/guide member 3000, the hook 2110 and the holders 2120 just before the combination thereof will be described in detail.

The area of the hole 2121 of the holder 2120 can be not less than the sum area of the third and fourth surfaces 2113 and 2114 of the hook 2110. The upper surface of the hook rack 3400 can be opposite to the sixth surface 2116 of the hook 2110.

In order to combine the panel support/guide member 3000 with the hook 2110 and the holders 2120, the hook 2110 can be bent in the outward direction and inserted into (or penetrate through) the hook hole 3300. When the hook 2110 is inserted into (or penetrates through) the hook hole 3300, the hook 2110 can return to its original position by its elasticity and be locked with the hook rack 3400.

Figure 10:
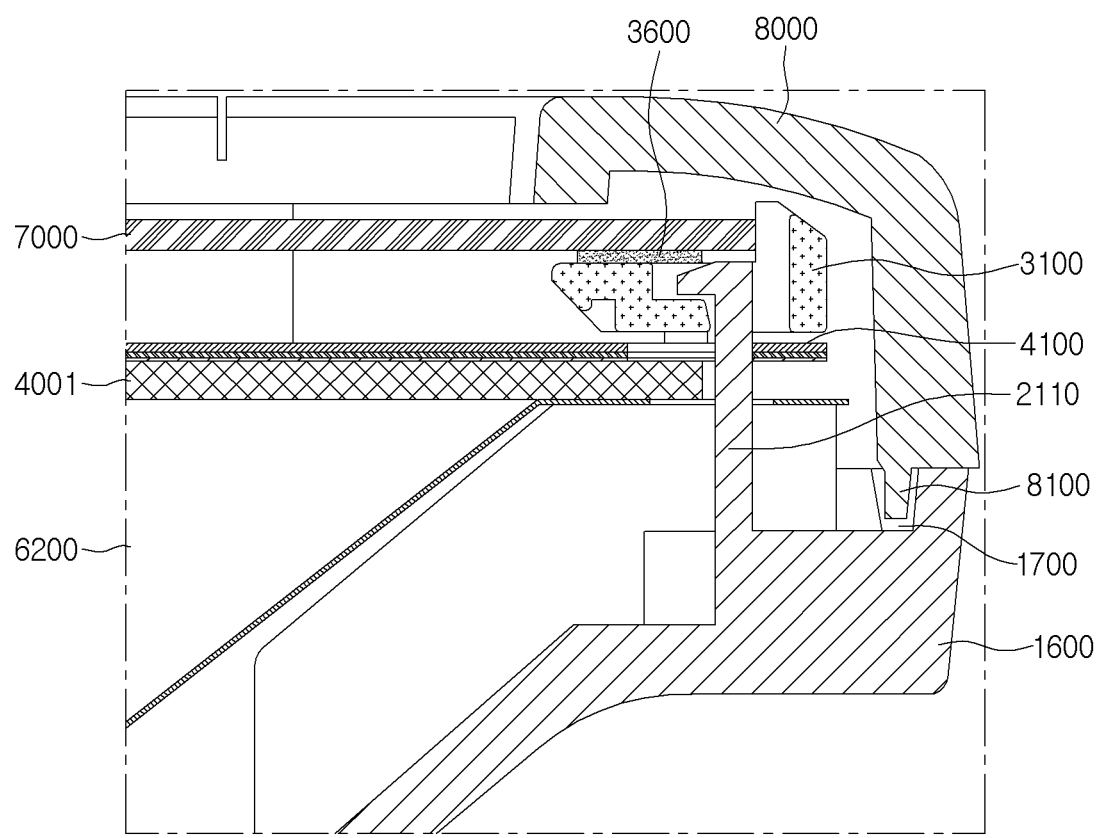
FIG. 10 is a cross-sectional view showing a cross-sectional structure of the backlight unit taken along a line A-B in FIG. 9.
Figure 11:
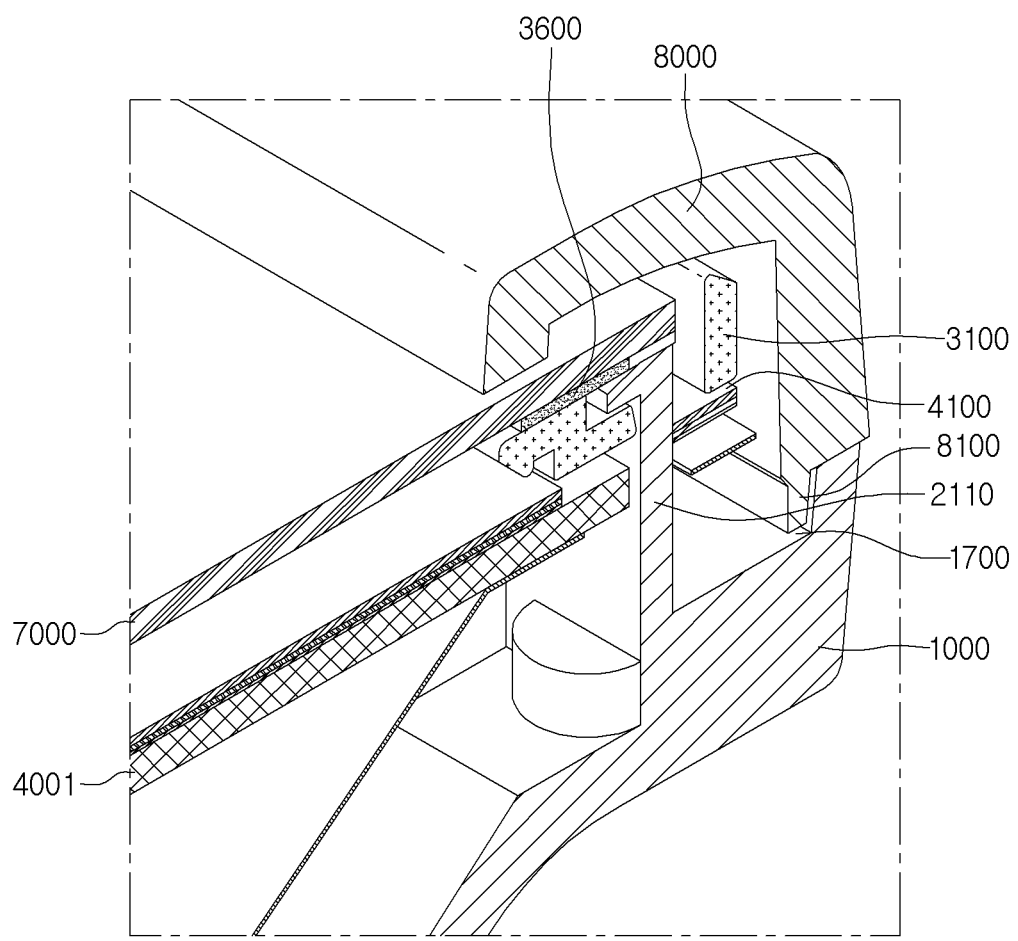
FIG. 11 is a perspective view showing a cross-sectional structure of the backlight unit taken along a line A-B in FIG. 9.

FIG. 10 is a cross-sectional view showing a cross-sectional structure of the backlight unit taken along a line A-B in FIG. 9. FIG. 11 is a perspective view showing a cross-sectional structure of the backlight unit taken along a line A-B in FIG. 9.

Referring to FIGS. 1 through 4 and 8 through 10, a pad member 3600 can be attached on the upper surface of the panel support plate 3100 of the panel support/guide member 3000. The pad member 3600 can be formed from one of silicon and polyurethane.

The pad member 3600 can prevent damage of the liquid crystal panel 7001 due to the friction between the liquid crystal panel 7001 and the panel support plate 3100, when the liquid crystal panel 7001 is placed on the panel support plate 3100. The friction between the liquid crystal panel 7001 and the panel support plate 3100 can be caused by a slight movement of the liquid crystal panel 7001 being in surface contact with the panel support plate 3100.

A top case engage groove 1700 can be formed in the bottom cover 1000.

In detail, the top case engage groove 1700 can be formed along the outline 1110 of the front wing surface 1100 of the bottom cover 1000. The top case engage groove 1700 can be engaged with a bottom cover engage land 8100 of the top case.

In other words, the top case engage groove 1700 can be formed in the front wing surface edge 1110 of the bottom cover 1000 corresponding to the outer side of the optical member fixation portion 2100.

As described above, the locking hole portions are formed in the edges of the light source receptacle 6200 which receives the light source 6100 and is used as a reflective sheet. As such, the light source receptacle can be locked with (or fastened to) the hooks 2110.

The top case 8000 can be disposed to encompass the side surfaces and the upper surface edges of the panel 7000.

The light source receptacle 6200 can be formed in an opposite shape to the inner surfaces of the bottom cover 1000. In detail, the light source receptacle 6200 can include a flat bottom surface 6220, inclined side surfaces 6210 extending outwardly and upwardly from the edges of the bottom surface 6220, and front wing surfaces 6240 extending outwardly from top edges of the side surfaces 6210. The front wing surfaces 6240 can be formed in a parallel direction to the bottom surface 6210.

The edges of the rear surface of the light guide plate 4001 can be opposite to the front wing surfaces 6240 of the light source receptacle 6200. As such, the light source guide 4001 can be placed on the front wing surfaces 6240 of the light source receptacle 6200.

Figure 12:
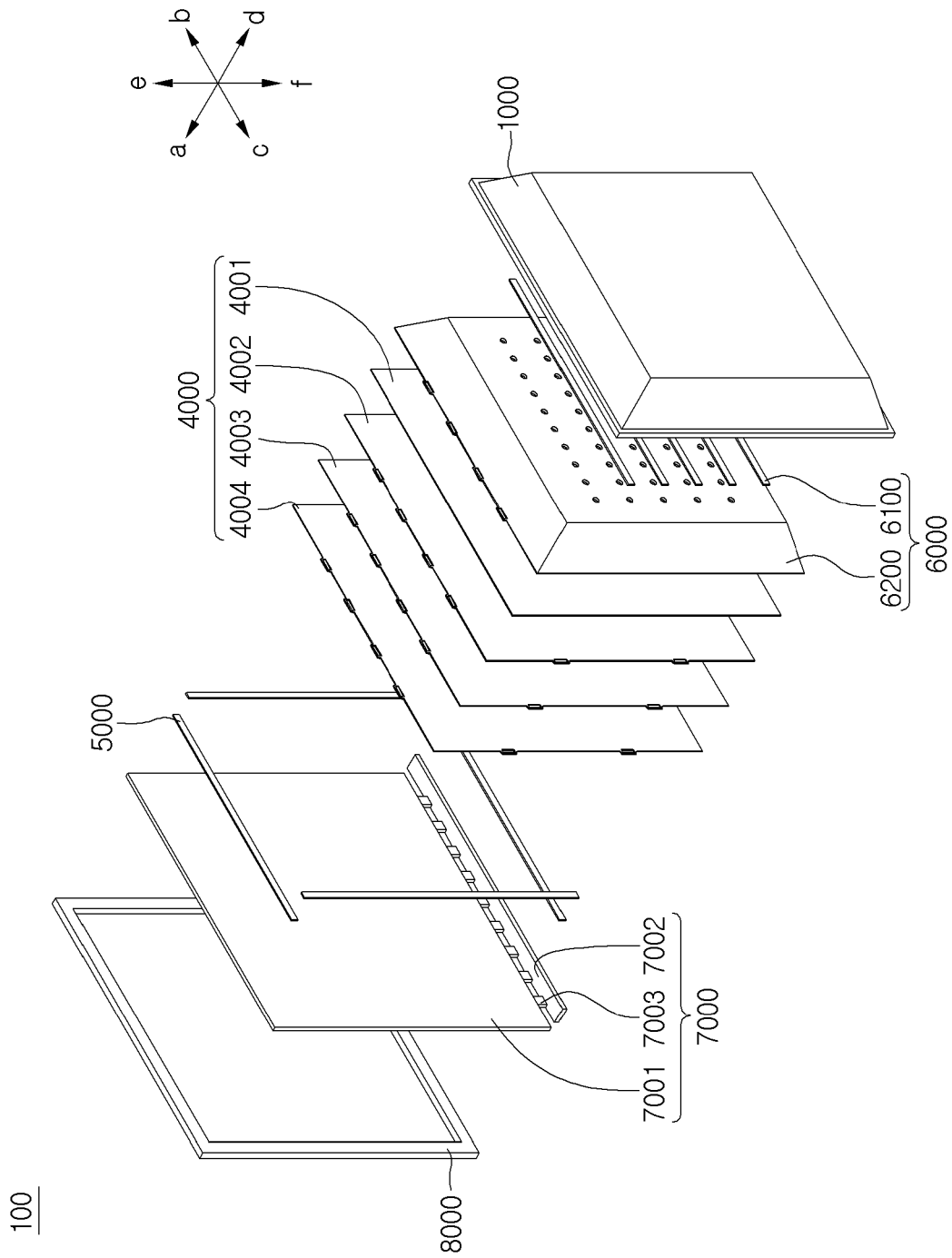
FIG. 12 is an exploded perspective view showing a backlight unit according to a second embodiment of the present disclosure.
Figure 13:
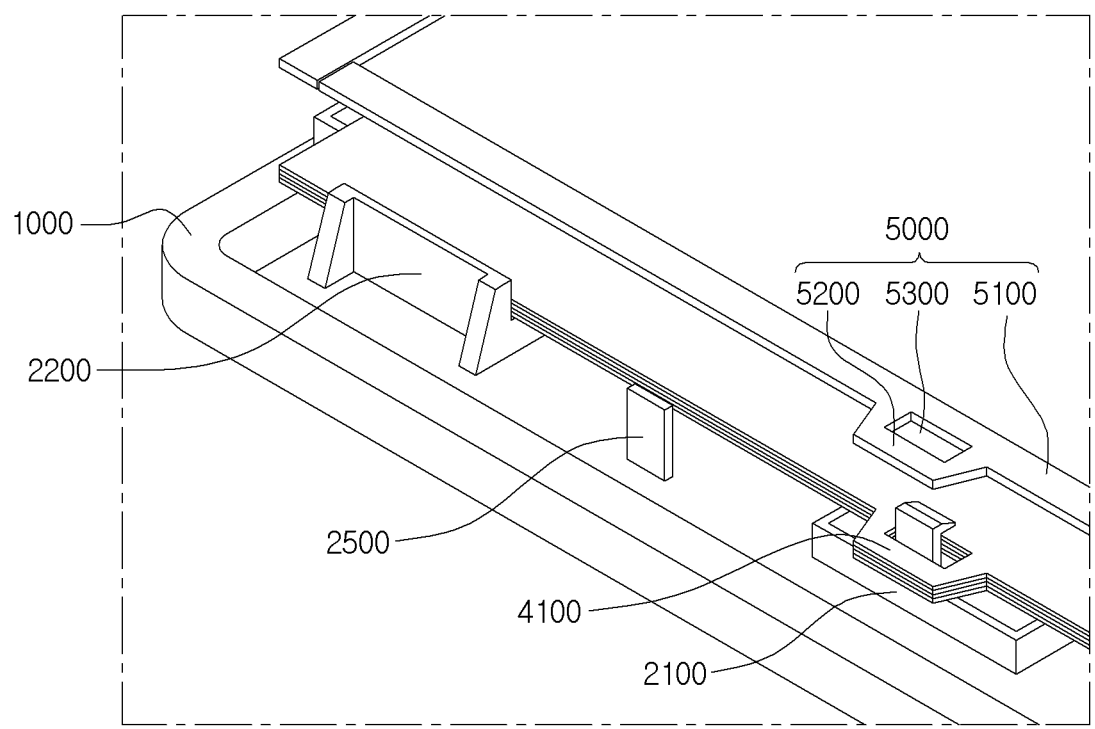
FIG. 13 is a perspective view showing a panel-support and sheet-fixation pad, optical sheets and a bottom cover according to a second embodiment of the present disclosure.
Figure 14:
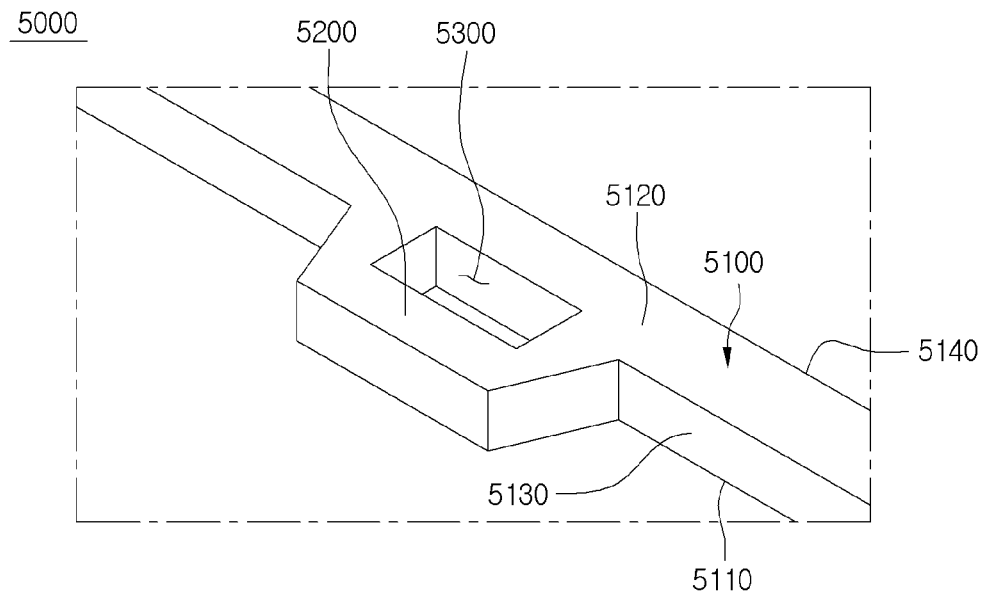
FIG. 14 is a perspective view showing a pane-support/sheet-fixation pad.
Figure 15:
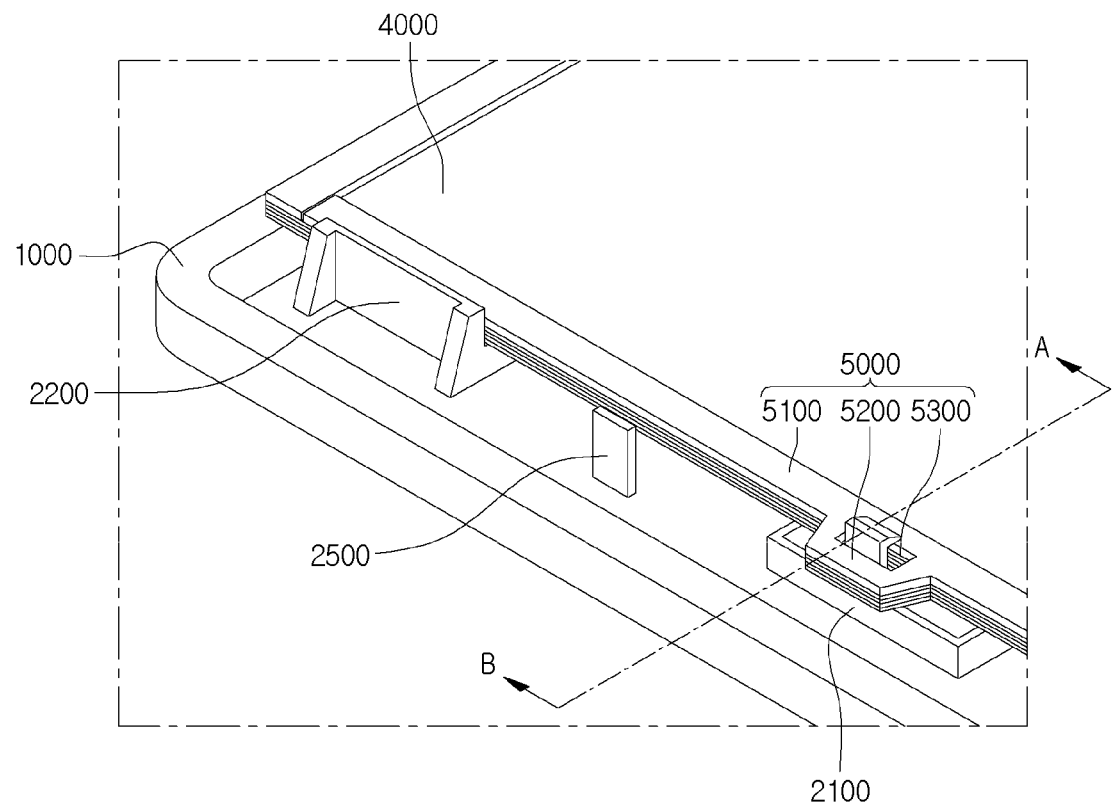
FIG. 15 is a perspective view showing a combinatorial state of a bottom cover, optical sheets and a panel-support/sheet-fixation pad.
Figure 16:
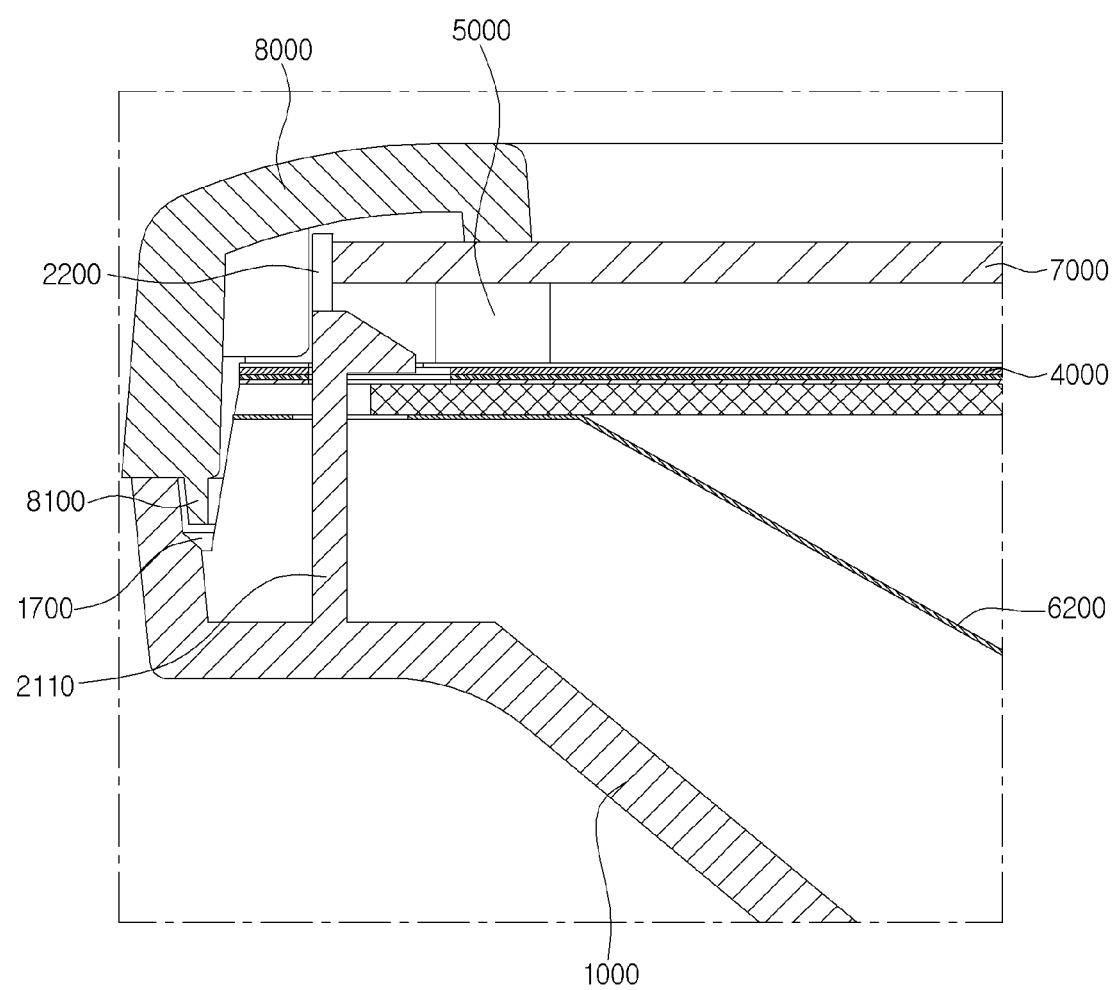
FIG. 16 is a cross-sectional view showing a cross-sectional structure of the backlight unit taken along a line A-B in FIG. 15.
Figure 17:
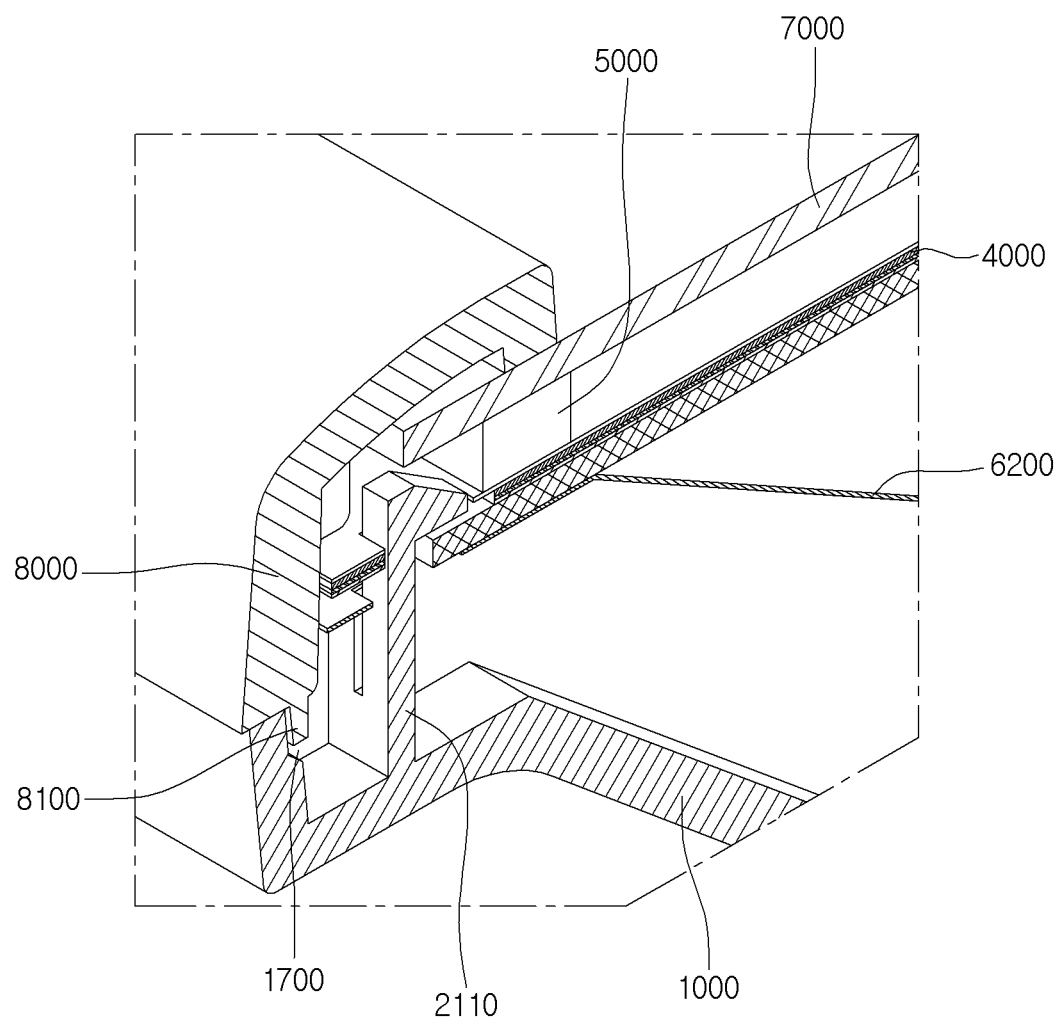
FIG. 17 is a perspective view showing a cross-sectional structure of the backlight unit taken along a line A-B in FIG. 15.

FIG. 12 is an exploded perspective view showing a backlight unit according to a second embodiment of the present disclosure. FIG. 13 is a perspective view showing a panel-support/sheet-fixation pad, optical sheets and a bottom cover according to a second embodiment of the present disclosure. FIG. 14 is a perspective view showing a part of a panel-support/sheet-fixation pad. FIG. 15 is a perspective view showing a combinatorial state of a bottom cover, optical sheets and a panel-support/sheet-fixation pad. FIG. 16 is a cross-sectional view showing a cross-sectional structure of the backlight unit taken along a line A-B in FIG. 15. FIG. 17 is a perspective view showing a cross-sectional structure of the backlight unit taken along a line A-B in FIG. 15.

The backlight unit of the second embodiment can include the same components as that of the first embodiment. Components of the second embodiment having the same function and shape as those of the first embodiment will be referred to by the same reference numbers and names. Also, the description of the second embodiment overlapping with the first embodiment in the effect will be omitted.

As shown in FIGS. 12 through 17, the backlight unit according to a second embodiment of the present disclosure can include a panel-support/sheet-fixation pad 5000.

The panel-support/sheet-fixation pad 5000 can be provided in plurality. For example, four panel-support/sheet-fixation pads 5000 can be disposed on upper, lower, left and right edges of the optical members 4000.

The panel-support/sheet-fixation pad 5000 can be formed in a bar shape. In detail, the panel-support/sheet-fixation pad 5000 can include a body frame 5100 and a hook ring portion 5200 formed to protrude from a region of an outer side surface of the body frame 5100.

Although it is shown in the drawings that the hook ring portion 5200 and the body frame 5100 are formed in a single body united with each other, the present disclosure is not limited to this. In other words, the hook ring portion 5200 and the body frame 5100 can be independently formed in such a manner as to be separate from each other. Also, although it is shown in the drawings that the hook ring portion 5200 and the body frame 5100 are formed to have the same thickness, the present disclosure is not limited to this. Alternatively, the hook ring portion 5200 can be formed in a smaller thickness than that of the body frame 5100.

The hook ring portion 5200 can be opposite to the sheet ring portion 4100. As such, a hook hole 5300 is formed in the hook ring portion 5200. The hook hole 5300 can be pierced by the hook 2110.

The body frame 5100 can be opposite to an upper surface edge of the optical sheets 4000. As such, the body frame 5100 can be disposed on the upper surface edge of the optical sheets 4000.

The body frame 5100 can include a lower surface 4110, an upper surface 5120, an outward side surface 5130 and an inward side surface 5140. The hook ring portion 5200 can be formed to protrude outwardly from the outward side surface 5130 of the body frame 5100. The lower surface 5110 of the body frame 5100 can be opposite to the upper surface edge of the highest optical sheet among the optical sheets 4000. As such the body frame 5100 can fasten the optical sheets 4000.

The upper surface 5120 of the body frame 5100 can be opposite to the lower surface edge of the panel 7000. As such, the panel 7000 can be placed on the upper surface 5120 of the body frame 5100 and supported by the body frame 5100.

Preferably, the hook 2110 is formed in a height enough to fasten the optical members 4000 and the panel guide pad 5000 using its sixth surface 2116.

The panel support portions 2200 described in the backlight unit of the first embodiment can be formed in the bottom cover 1000. Such optical member support portions 2200 can guide the slight movements of the panel 7000 in the upward, downward, leftward and rightward directions and allow the panel 7000 to be fastened within a fixed area.

Also, optical sheet guide portions 2500 can be formed to protrude from the front wing surface edge 1110 of the bottom cover 1000 in the frontward direction. Such optical sheet guide portions 2500 can guide the slight movements of the panel 7000 and the optical members 4000 in the upward, downward, leftward and rightward directions and allow the panel 7000 to be fastened within the fixed area.

On the other hand, the backlight unit of the first embodiment allows the optical member fixation portion 2100 to include the hook 2110 and the holders 2120. As such, the locking ring portion of the light source receptacle 6200 and the sheet ring portions of the optical sheets 4002, 4003 and 4004 are locked with the hook 2110. Also, the panel support/guide member 3000 can be combined with the hook 2110 and the holders 2120. However, the backlight unit of the second embodiment enables the optical member fixation portion 2100 to include only the hook 2110 without the holders 2120. In accordance therewith, the panel-support/sheet-fixation pad 5000 together with the optical sheets 4002, 4003 and 4004 can be locked with (or fastened to) the hook 2110.

As described above, the backlight units according to embodiments of the present disclosure can guide the slight movements of the liquid crystal panel 7001 in the upward, downward, left and right directions and fasten the liquid crystal panel 7001, using the fixation portions, which include optical member fixation portion 2100, the optical member support portion 2200 and the multipurpose fixation portion 2300, and one of the panel support/guide member 3000 and the panel-support/sheet-fixation pad 5000. In other words, the backlight units can fasten the liquid crystal panel 7001 without using the guide panel, unlike the related art backlight unit. As such, the guide panel can be removed and furthermore a narrow bezel can be realized.

Also, as the fixation portions are employed instead of the guide panel, material costs and mold manufacture costs can be reduced and the backlight unit can become lighter in weight.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A backlight unit comprising:
   optical members configured to each include a sheet ring portion having an optical sheet hole;
   a bottom cover configured to receive the optical members;
   an optical member fixation portion formed in a fixation portion mounting region of the bottom cover, and configured to include a hook and a holder; and
   a panel support/guide member combined with the hook and the holder and configured to guide the panel, wherein the hook is received in the optical sheet hole, and wherein the optical member fixation portion is protruded from the bottom cover.

2. The backlight unit of claim 1, wherein the panel support/guide member includes:
a panel support plate configured to support a panel;
a hook ring portion pierced by the hook;
a hook rack configured to lock the hook; and
an insertion fastener inserted into the holder.

3. The backlight unit of claim 2, further comprising a pad disposed on the panel support plate.

4. The backlight unit of claim 1, further comprising an optical member support portion configured to support the optical members and guide a panel, wherein the optical member support portion includes:
a first body plate formed to guide an edge of the panel; and
first support walls extended from both side edge of a lower portion of the first body plate in inward directions of the bottom cover and configured to support the optical members.

5. The backlight unit of claim 1, further comprising a first multipurpose fixation portion configured to guide a panel and fasten a printed circuit board, wherein the first multipurpose fixation portion includes:
a vertical plate configured to guide the panel;
a first horizontal bump formed to extend from the vertical plate in an outward direction of the bottom cover; and
a first protrusion formed to protrude from the first horizontal bump in a frontward direction of the bottom cover and configured to fasten the printed circuit board.

6. The backlight unit of claim 1, further comprising a second multipurpose fixation portion configured to guide a panel and fasten a printed circuit board, wherein the second multipurpose fixation portion includes:
a second body plate formed to guide the panel:
a second horizontal bump formed to extend from the second body plate in an outward direction of the bottom cover;
a second protrusion formed to protrude from the second horizontal bump in a frontward direction of the bottom cover and configured to fasten the printed circuit board; and
second support walls extended from both side edge of a lower portion of the second body plate in inward directions of the bottom cover and configured to support the optical members.

7. The backlight unit of claim 1, further comprising a panel-support/sheet-fixation pad configured to support a panel and fasten the optical members.

8. The backlight unit of claim 7, wherein the panel-support/sheet-fixation pad includes:
a body frame disposed on the optical members;
a hook ring portion formed to extend from an outer side surface of the body frame; and
a hook hole formed in the hook ring portion and pierced by the hook.

9. The backlight unit of claim 8, wherein a lower surface of the body frame is used to fasten the optical members and an upper surface of the body frame is used to support the panel.

10. A backlight unit comprising:
a top-opened case formed to include a front wing surface and configured to receive optical members; and
an optical member fixation portion formed in a front wing surface of the case; and
an optical member support portion configured to support the optical members and guide a panel, where the optical member support portion further includes a first body plate formed to guide an edge of the panel and first support walls extended from both side edges of a lower portion of the first body plate in inward directions of the case and configured to support the optical members,
wherein the optical member fixation portion includes a hook formed to extend from the front wing surface of the case in a frontward direction and configured to fasten the optical members, and
wherein the optical member fixation portion is protruded from the front wing surface.

11. The bottom cover of claim 10, further comprising a first multipurpose fixation portion configured to guide a panel and fasten a printed circuit board, wherein the first multipurpose fixation portion includes:
a vertical plate configured to guide the panel;
a first horizontal bump formed to extend from the vertical plate in an outward direction of the case; and
a first protrusion formed to protrude from the first horizontal bump in a frontward direction of the case and configured to fasten the printed circuit board.

12. The backlight unit of claim 10, further comprising a second multipurpose fixation portion configured to guide a panel and fasten a printed circuit board, wherein the second multipurpose fixation portion includes:
a second body plate formed to guide the panel;
a second horizontal bump formed to extend from the second body plate in an outward direction of the case; and
a second protrusion formed to protrude from the second horizontal bump in a frontward direction of the case and configured to fasten the printed circuit board; and
second support walls extended from both side edge of a lower portion of the second body plate in inward directions of the case and configured to support the optical members.

13. A backlight unit comprising:
at least one optical sheet including a first hook hole;
a hook configured to hold the at least one optical sheet;
a panel support portion configured to guide a panel;
a bottom cover configured to receive the at least optical sheet and the panel, and
a pad configured to support the panel and hold the at least one optical sheet,
wherein the hook and the panel support portion are configured to integrate with the bottom cover and the pad has a bar shape.

14. The backlight unit of claim 13, wherein the pad further comprises a body frame and a second hook hole.

15. The backlight unit of claim 13, wherein a lower surface of the pad configured to hold the at least one optical sheet and an upper surface of the pad configured to support the panel.

16. The backlight unit of claim 13, wherein the panel support portion further comprises:
a first body plate formed to guide an edge of the panel;
support walls extended from both side edge of a lower portion of the first body plate in inward directions of the bottom cover.

17. An apparatus comprising:
a panel having an array of display elements;
a plurality of optical sheets behind the panel and configured to provide optical adjustments with respect to the display elements;
a cover behind the optical sheets, having integral elements configured to allow attachment of the optical sheets to the panel and configured to forego any need for a guide panel to attach the optical sheets to the panel; and a plate configured to engage over the optical sheets, the plate having an opening configured to receive the hook-shaped element that passed through the opening on each of the optical sheet and having at least one mount or post that engages with a respective groove in a respective one of the integral elements.

18. The apparatus of claim 17, wherein the integral elements are located at selective portions of a mounting rib along a rectangular periphery of the cover.

19. The apparatus of claim 18, wherein each of the integral elements comprises a hook-shaped element configured to engage with an opening on at least one of the optical sheets.

20. The apparatus of claim 19, wherein the hook-shaped element is configured to have an appropriate length to engage with each respective opening on each of the optical sheets such that all optical sheets are engaged.

* * * * *